Jan. 9, 1934.  C. R. HUBBARD ET AL  1,942,705
OIL SEALING DEVICE
Filed March 19, 1932
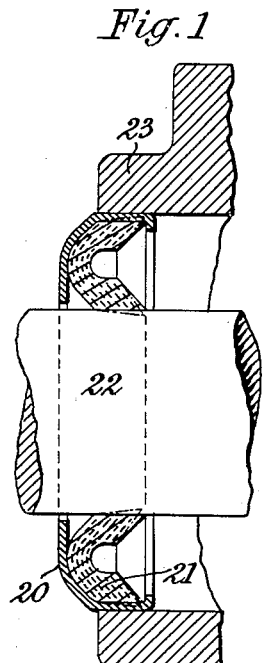
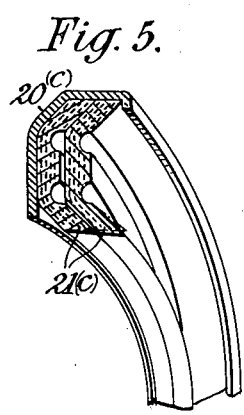
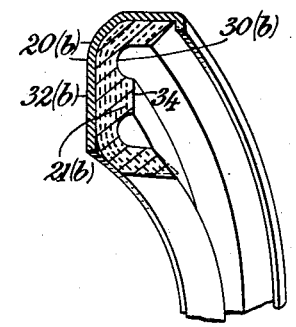
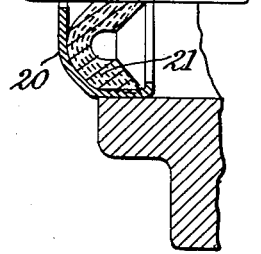
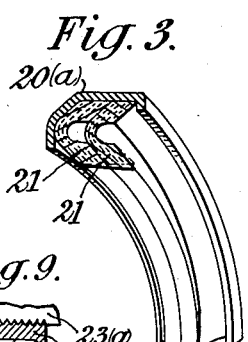
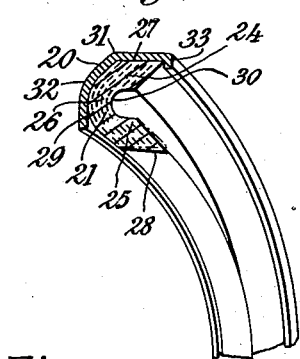
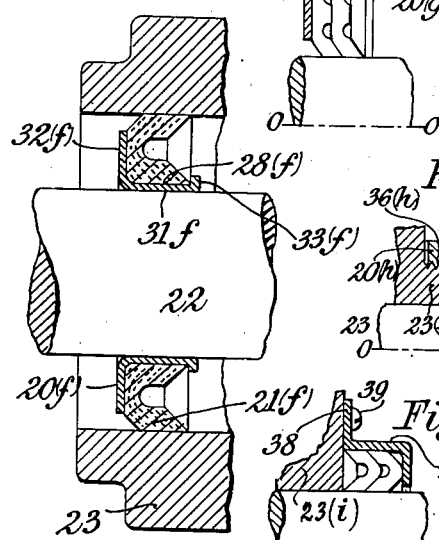
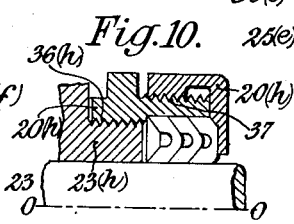
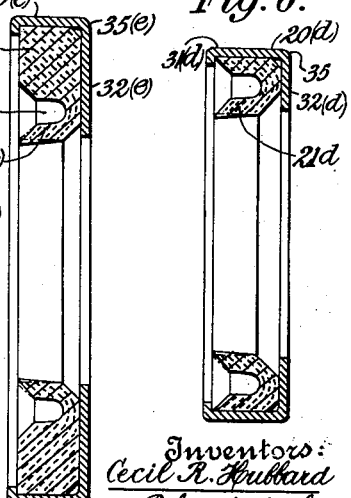
Inventors:
Cecil R. Hubbard
and Robert P. Waples
By their Attorneys,
Fraser, Myers & Manley.

Patented Jan. 9, 1934

1,942,705

UNITED STATES PATENT OFFICE 1,942,705

OIL-SEALING DEVICE

Cecil R. Hubbard and Robert M. Waples, Palmyra, N. Y., assignors to The Garlock Packing Company, Palmyra, N. Y., a corporation of New York Application March 19, 1932. Serial No. 599,876

4 Claims. (Cl. 288—1)

This invention relates to improvements in machinery packing adapted in general for use in sealing a joint between two relatively movable machine elements to prevent the escape of fluid of any kind, but more particularly adapted for use as an oil-retaining device to prevent the waste of lubricant, exclude dust and aid in keeping a power unit and its environment in a neat and attractive condition.

It is an object of the invention to provide an oil-retaining device of the above-described character which may consist of a minimum number of relatively simple parts which may be economically manufactured and readily installed and replaced when worn out.

It is a further object of the invention to provide an oil-retaining device of the above-described character which will continue to maintain a satisfactory sealing contact with the movable part of the power unit even after a considerable portion of the part which makes direct contact with the movable element has been worn away.

In the accompanying drawing illustrating preferred forms of the invention,—

Figure 1 is a fragmentary, longitudinal, sectional view of a pair of relatively movable machine elements with an oil-retaining device embodying the invention mounted within an intervening annular space.

Fig. 2 is a view, partly sectional and partly perspective, of the form of oil-retaining device illustrated in Fig. 1.

Fig. 3 is a similar view of a modified form of oil-retaining device having two resilient oil-sealing rings mounted in a single shell.

Fig. 4 is a similar view of a second modified form of oil-retaining device embodying the invention, the oil-sealing ring differing from that illustrated in Fig. 2 in that it has two channels instead of one.

Fig. 5 is a similar view of a third modified form of oil-retaining device embodying the invention comprising a pair of oil-sealing rings like the one illustrated in Fig. 4 closely nested together in a single shell.

Fig. 6 is a transverse, cross-sectional view of another modification of the retaining device having a resilient ring of slightly different cross-sectional form from the one illustrated in Fig. 2.

Fig. 7 is a similar view of another modified form having a resilient ring of relatively great radial depth having a channel in one of its surfaces located relatively close to its inner margin.

Fig. 8 is a fragmentary, longitudinal, sectional view of a pair of relatively movable machine elements similar to those illustrated in Fig. 1, having an intervening annular space sealed by means of an oil-retaining device of which the shell is of modified form.

Figs. 9 to 11 are cross-sectional views of parts of devices embodying other modified forms of the invention.

The invention in the form illustrated in Figs. 1 and 2 comprises a one-piece relatively rigid shell 20 of metal or other appropriate material, within which is mounted a resilient sealing ring 21 of any suitable material such, for example, as asbestos fibre and rubber composition.

In order that the oil-retaining device 20, 21 of Fig. 2 may be effectively mounted between a pair of relatively movable machine elements 22, 23, as indicated in Fig. 1, it is important that the radial depth of the element 20 be somewhat less than that of the annular space between the parts 22, 23, thus affording a sufficient clearance to prevent undesirable contact between the element 22 and the ring 20. It is also important that the normal radial depth of the sealing ring 21 be somewhat greater than that of the annular space within the shell 20 about the machine element 22.

In Figs. 1 and 8 the machine elements have been represented as comprising a cylindrical shaft 22 and a surrounding element 23 having a cylindrical inner surface, but it will be apparent that the invention is not limited to use with elements of which both surfaces are cylindrical since either surface might be of some other form subject only to the condition that the contacting surfaces of the oil-retaining device be of complemental form, and if the relative movement is rotational, the surfaces between the relatively moving parts should be surfaces of revolution.

As will be apparent from a comparison of Figs. 1 and 8, the shell 20, 20(f) may be mounted on either of the two relatively movable machine elements, and the oil-retaining device may be made equally effective whether the shaft or the surrounding structure, or both, be movable.

In applying the oil-retaining device to a power unit, the shell should be fixedly secured to the machine element on which it is to be mounted, the adjacent surface portions being of such dimensions as to cause one part to have snug contact with the other such as to prevent the escape of lubricant at the joint.

The resilient element 21, the radial depth of which when free is equal to, or preferably greater than, that of the annular space within which it is compressed when the retaining device is assembled with the power unit, effectively prevents any escape of oil or lubricant either between the resilient element and the shell or between the resilient element and the machine element with which it makes contact.

If the shaft 22 is to be rotatable and the surrounding structure 23 fixed, it may be preferable to mount the shell 20 in fixed relation with the member 23 and permit the resilient ring 21 to make contact with the shaft. On the other hand, if the shaft 22 is to be stationary and the surrounding structure 23 rotatable, it may be best to mount the shell 20(f) in fixed relation upon the shaft and permit the resilient ring 21(f) to make contact with the inner surface of the surrounding structure, as indicated in Fig. 8.

Should both parts be rotatable at different speeds or in different directions, it may be preferable to mount the shell upon that one of the two elements of which the speed of rotation is least.

In the form of oil-retaining device illustrated in Fig. 2 the resilient ring is represented as comprising an annular structure having an outer element 24, an inner element 25, and a connecting element 26 about which the outer and inner elements may be bent or flexed to vary the radial depth of the ring. The outer and inner elements 24, 25 may be provided with relatively smooth, substantially cylindrical surfaces 27, 28, respectively, and these surfaces may be connected with a lateral surface 29 preferably of a more or less convex cross-sectional form.

In order to provide for the relatively radial movement of the parts 24, 25 of the ring, it may be channeled as at 30 in the side opposite the lateral surface 29, and the two portions 24, 25 may, if desired, be flared outwardly from the channel towards the surfaces 27, 28, to provide a pair of relatively sharp lips at the inner and outer margins of the ring.

When making the ring it may be molded to a form such as to cause the surfaces 27, 28 to be flared outwardly so as to be of a conical form, whereby, when the ring is compressed between a pair of machine elements as indicated in Fig. 1, the surfaces 27, 28 may naturally assume a substantially cylindrical form. This change of the resilient ring from its normal form to its assembled form is illustrated in Fig. 1 in which the normal form is represented in broken lines and the assembled form in full lines.

The shell for the retaining device, as illustrated in Fig. 1, may comprise an outer substantially cylindrical element 31 to provide a seat for the outer element 24 of the resilient ring, an inwardly-directed flange 32 against which the lateral surface 29 of the resilient ring may be seated whereby the flange may serve as a restraining element and prevent movement of the resilient ring when the channeled surface is subjected to pressure, and an inwardly-directed confining flange 33 to maintain the resilient ring 21 and shell 20 in their assembled relations.

The shell 20 may, as indicated, comprise a single sheet of metal having one end rolled inwardly to provide the flange 32 and the other end rolled inwardly to provide the flange 33.

It will be apparent that the channeling of the resilient ring at 30 provides a zone of weakness midway between the outer and inner portions of the ring adapted to serve as something in the nature of a hinge-like joint about which most of the bending may take place when the ring is compressed to its working position between a pair of machine elements. The ring is thus held in a state of compression but constantly tends to open out or increase its radial depth so that, as the surface 28 is worn away by the movement of the surface of the part 22 (Fig. 1) against which it bears, it will open out and maintain an effective seal against the escape of lubricant.

In the form of the invention illustrated in Fig. 3 the retaining device comprises a pair of resilient rings 21 which may be of substantially the same form as the single ring illustrated in Fig. 2. These rings may be mounted in a single shell 20(a) of which the outer substantially cylindrical element may be of an increased size such as to accommodate the two rings. The rings, as indicated, may be closely nested together with the convex lateral surface of one in contact with portions of the channeled surface of the other. The two rings produce a structure somewhat more flexible and, therefore, somewhat better adapted to maintain an oil seal between their inner surfaces and the moving machine element with which they make contact than would be true of a single resilient ring of the same external cross-sectional size and form.

In Fig. 4 is illustrated a modified form of the invention adapted for use when the annular space between the machine elements in association with which the retaining device is to be used is relatively great as compared with the diameters of the surfaces of said elements. In this form of retaining device the resilient ring 21(b) differs from that of the ring illustrated in Fig. 2 in that it has two channeled zones 30(b) separated by an intermediate portion 34. The shell 20(b) may have a restraining flange 32(b) of a radial depth such as to accommodate the increased radial depth of the resilient ring.

In Fig. 5 is illustrated a modified form of the invention differing from that disclosed in Fig. 4 exactly as the form illustrated in Fig. 3 differs from that illustrated in Fig. 2. It comprises two resilient rings 21(c) each of the same general form as the ring 21(b) of Fig. 4 and a shell 20(c) of which the outer substantially cylindrical portion is of a size such as to accommodate the pair of resilient rings, which may be closely nested together within the shell with the convex surface of one in contact with portions of the channeled surface of the other.

The form of the invention illustrated in Fig. 6 differs from that illustrated in Fig. 1 in that the substantially cylindrical portion 31(d) and the restraining flange 32(d) of the shell 20(d) meet at substantially a right angle at 35 instead of being beveled off, thus affording an increased sealing surface between the element 31(d) and the machine element against which it is assembled. The resilient ring 21(d) may be of modified form to conform with the change in shape of the shell.

Fig. 7 illustrates a modified form of the invention adapted for use when the radial depth of the annular space between the pair of machine elements in association with which the oil-retaining device is to be used is relatively great. It differs from the form illustrated in Fig. 4 in that the shell 20(e) is of the form in which the outer element and the restraining flange 32(e) meet substantially at right angles as at 35(e) and the resilient ring 21(e) has but a single channel 30(e) disposed relatively close to the inner margin of the ring, thus providing a flexible lip 25(e) adapted to maintain an oil-sealing contact with an adjacent moving surface.

It will be obvious that if the shell 20(f) is to be mounted upon the inner of the two machine elements to be sealed by the oil-retaining device as indicated in Fig. 8, its substantially cylindrical element 31(f) will form a seat for the inner substantially cylindrical surface 28(f) of the resilient ring and that the restraining flange 32(f) and confining flange 33(f) will turn outwardly instead of inwardly. It will also be obvious that any of the oil-retaining devices represented by Figs. 3 to 7, inclusive, may be correspondingly modified to provide for the mounting of the shell upon the inner machine element of a pair so that the free surface of the resilient ring may make frictional contact with the outer element.

When mounting an oil-retaining device between a pair of machine elements it is intended that it shall be assembled with the channeled face of the resilient ring directed towards the part of the structure from which oil or other lubricant would tend to flow, and with the restraining flange of the shell facing in the opposite direction. When thus mounted, any tendency of the confined oil or lubricant to force its way through the annular space between the pair of machine elements would cause the outer and inner portions of the resilient ring to spread apart so as to more effectively compress their outer surfaces against the confining portions of the structure and thus maintain a reliable sealing contact.

Although it is the primary purpose of the device to thus prevent the escape and waste of lubricant and to exclude dust from the bearings or other parts of the power unit protected by the oil-retaining device, it may also serve as a packing adapted to prevent the flow of steam, water vapor, gases or other fluids through an annular space between any two relatively movable parts of a power unit, whether such movement be rotational, reciprocatory, or both.

If one of the machine elements of the power unit in which the retaining device is to be installed is intended to be rotated or reciprocated with respect to the other, and if the mechanism were perfect, there would, of course, be no lateral movement, that is, movement in a direction at right angles to the axis of the retaining device. Due to slight imperfections of the parts or to unintended deformation of such parts, such lateral movements do occur. A packing and oil-retaining device of the character of the one herein described is well adapted to maintain a seal notwithstanding such slight lateral movements. This is due to the fact that every part of the resilient ring which makes contact with the moving surface is capable of being flexed and is held in a state of compression such as to cause it to maintain its sealing contact whether the adjacent surface of the machine element moves toward or away from the same. This will be true until the ring has been worn away to such an extent that the internal stress within the resilient ring has been reduced to zero.

In Figs. 9, 10 and 11 are disclosed three additional modified forms of the invention which have been embodied in commercial structures. The form illustrated in Fig. 9 differs from those previously disclosed in that the shell 20(g) is secured to the machine element 23(g) by means of a threaded connection 36. In the form illustrated in Fig. 10 the shell may be regarded as comprising two parts 20(h), 20(h), united by a threaded connection 37, one of said parts being connected with the machine element 23(h) by means of a threaded connection 36(h). In the form illustrated in Fig. 11 the shell 20(i) is represented as having a radially-disposed flange 38 held in fluid-tight contact with a surface portion of the machine element 23(i) by means of screws or other appropriate fastening devices 39. In each of these fragmentary cross-sectional views, Figs. 9, 10 and 11, the broken line O—O represents an axis of revolution.

The invention is not intended to be limited in its application to the specific forms which have been selected for purposes of illustration, but should be regarded as covering modifications and variations thereof within the scope of the appended claims.

What is claimed is:—

1. An oil-retaining device to seal the annular joint between two concentrically-mounted, relatively movable machine elements, said device comprising a relatively rigid annular shell having a flexible sealing ring mounted therein, said sealing ring comprising an outer portion having a smooth, substantially cylindrical, outer sealing surface, an inner portion having a smooth, substantially cylindrical, inner sealing surface, and a connecting portion having a smooth lateral sealing surface, said sealing ring being channeled along the zone between said outer and inner portions at the side opposite said lateral sealing surface and compressed into an annular space of less radial depth than the normal radial depth of the ring, and said shell comprising a portion having one surface adapted for fluid-tight engagement with one of the two machine elements, and another substantially cylindrical surface to form a seat for one of the substantially cylindrical sealing surfaces of the resilient ring, and a restraining flange having an internal surface conforming and in contact with a portion of the lateral sealing surface of the resilient ring, the radial depth of the resilient ring being greater than that of the restraining flange, and its outer and inner portions being capable of being flexed about the intermediate channeled portion.

2. An oil-retaining device to seal the annular joint between two concentrically-mounted, relatively movable machine elements, said device comprising a relatively rigid annular shell having a flexible sealing ring mounted therein, said sealing ring comprising an outer portion having a smooth, substantially cylindrical, outer sealing surface, an inner portion having a smooth, substantially cylindrical, inner sealing surface, and a connecting portion having a smooth, lateral sealing surface, said sealing ring having a pair of channels of different diameters in the side opposite its lateral sealing surface whereby the inner and outer portions of the ring may be independently flexed with respect to an intermediate portion between the channels and thereby permit the ring to be readily compressed into an annular space of less radial depth than the normal radial depth of the ring, and said shell comprising a portion having one surface adapted for fluid-tight engagement with one of the two machine elements and another substantially cylindrical surface to form a seat for one of the substantially cylindrical sealing surfaces of the resilient ring, and a restraining flange having an internal surface conforming and in contact with a portion of the lateral sealing surface of the resilient ring, the radial depth of the resilient ring being greater than that of the restraining flange.

3. An oil-retaining device to seal the annular space between a pair of relatively rotatable machine elements comprising a shaft and a surrounding structure, said retaining device comprising a flexed resilient ring having an annular lip held by the inherent elastic properties of said ring in forcible contact with the surface of one of said machine elements with its free edge facing towards the direction from which the flow of oil is to be intercepted and a relatively rigid ring consisting of two detachably connected portions one of which has an annular surface portion to be detachably connected and held in oil-tight contact with the surface of the other of said machine elements and the other of which has an annular surface portion which is in oil-tight contact with the resilient ring and which also serves as an abutment to resist lateral movement of the resilient ring by the pressure of the sealed oil.

4. An oil-retaining device to seal the annular space between a pair of relatively rotatable machine elements comprising a shaft and a surrounding structure, said retaining device comprising a flexed resilient ring having an annular lip held by the inherent elastic properties of said ring in forcible contact with the surface of one of said machine elements with its free edge facing towards the direction from which the flow of oil is to be intercepted and a relatively rigid ring having a cylindrical element to surround the resilient element with an outwardly-turned radially-disposed flange at one end to be held in oil-tight contact with one of the machine elements and an inwardly-turned radially-disposed flange at the opposite end to provide an abutment to resist lateral movement of the resilient ring by the pressure of the sealed oil.

CECIL R. HUBBARD.
ROBERT M. WAPLES.